United States Patent
Ghosh et al.

(10) Patent No.: US 11,334,834 B2
(45) Date of Patent: May 17, 2022

(54) SYSTEM AND METHOD FOR CONTROLLING POWER PRODUCTION FROM A WIND FARM

(71) Applicant: General Electric Company, Schenectady, NY (US)

(72) Inventors: Subhankar Ghosh, Bangalore (IN); Abhirup Mondal, Bangalore (IN); Necip Doganaksoy, Niskayuna, NY (US); Hongyan Liu, Clifton Park, NY (US); Zhanpan Zhang, Niskayuna, NY (US); Robert August Kaucic, Niskayuna, NY (US); Jay Zhiqiang Cao, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 884 days.

(21) Appl. No.: 15/601,145

(22) Filed: May 22, 2017

(65) Prior Publication Data

US 2017/0337495 A1    Nov. 23, 2017

(30) Foreign Application Priority Data

May 23, 2016 (IN) .............................. 201641017594

(51) Int. Cl.
*G06Q 10/06* (2012.01)
*G06F 16/48* (2019.01)
(Continued)

(52) U.S. Cl.
CPC ....... *G06Q 10/0639* (2013.01); *G06F 16/489* (2019.01); *G06Q 10/06375* (2013.01);
(Continued)

(58) Field of Classification Search
None
See application file for complete search history.

(56) References Cited

U.S. PATENT DOCUMENTS

| 6,909,198 B2 | 6/2005 | Ragwitz et al. |
| 8,930,299 B2 | 1/2015 | Pyle et al. |

(Continued)

FOREIGN PATENT DOCUMENTS

CN    103489041 A  *  1/2014

OTHER PUBLICATIONS

Patrick Ambach et al, "Wind Speed and Power Forecasting—A Review and Incorporating Asymmetric Loss," Feb. 18, 2016, International Symposium on Stochastic Models in Reliability Engineering, Life Science and Operations Management (SMRLO), 2nd, pp. 115-123 (Year: 2016).*

(Continued)

*Primary Examiner* — Amanda Gurski
(74) *Attorney, Agent, or Firm* — Dority & Manning, P.A.

(57) ABSTRACT

The system and method described herein relate to production of power from the wind farm that incorporate tunable power production forecasts for optimal wind farm performance, where the wind farm power production is controlled at least in part by the power production forecasts. The system and method use a tunable power forecasting model to generate tunable coefficients based on asymmetric loss function applied on actual power production data, along with tuning factor(s) that tune forecast towards under forecasting or over forecasting. The power production forecasts are generated using the tunable coefficients 34 and power characteristic features that are derived from actual power production data. The power production forecasts are monitored for any degradation, and a control action to regenerate the coefficients or retune the model is undertaken if degradation is observed.

14 Claims, 7 Drawing Sheets

(51) Int. Cl.
*H02J 3/38* (2006.01)
*F03D 7/04* (2006.01)

(52) U.S. Cl.
CPC .............. *H02J 3/386* (2013.01); *F03D 7/048* (2013.01); *F05B 2260/821* (2013.01); *F05B 2270/335* (2013.01); *H02J 2203/20* (2020.01); *Y02E 10/76* (2013.01); *Y02E 60/00* (2013.01); *Y04S 40/20* (2013.01)

(56) References Cited

U.S. PATENT DOCUMENTS

| 10,742,040 | B2* | 8/2020 | Bandi | H02J 3/381 |
| 2012/0038312 | A1* | 2/2012 | Abe | G01R 31/3842 |
| | | | | 320/101 |
| 2013/0046492 | A1 | 2/2013 | Westergaard | |
| 2015/0154504 | A1 | 6/2015 | Zhang et al. | |
| 2015/0207319 | A1* | 7/2015 | Miller | G06Q 50/06 |
| | | | | 700/291 |

OTHER PUBLICATIONS

Dutta et al. "Prediction of short term power output of wind farms based on least squares method", IEEE PES General Meeting, pp. 1-6, Jul. 25-29, 2010, Minneapolis, MN.

Ambach et al., "Wind Speed and Power Forecasting—A Review and Incorporating Asymmetric Loss", 2016 Second International Symposium on Stochastic Models in Reliability Engineering, Life Science and Operations Management (SMRLO), pp. 115-123, Feb. 15-18, 2016, Beer Sheva.

Foley, A.M., et al., "Current methods and advances in forecasting of wind power generation," Renewable Energy, vol. 37, Issue 1, pp. 1-8 (Jan. 2012).

Lau, A., and McSharry, P., "Approaches for Multi-Step Density Forecasts With Application to Aggregated Wind Power, "The Annals of Applied Statistics, vol. 4, Issue 3, pp. 1311-1341 (Mar. 4, 2010).

Patton, A.J., and Timmermann, A., "Properties of optimal forecasts under asymmetric loss and nonlinearity," Journal of Ecometrics, vol. 140, pp. 884-918 (Oct. 2007).

Swaminathan, K.K. et al., Systems and methods for improved wind power Generation, GE Co-Pending Application No. 3662/CHE/2015, filed on Jul. 17, 2015.

Ghosh, S. et al., System and method for controlling power production from a Wind farm, GE Co-Pending Application No. 201641011377, filed on Mar. 31, 2016.

Extended European Search Report and Opinion issued in connection with corresponding EP Application No. 17172423.0 dated Oct. 23, 2017.

* cited by examiner

SYSTEM AND METHOD FOR CONTROLLING POWER PRODUCTION FROM A WIND FARM

BACKGROUND

Embodiments of the present invention relate to controlling power production of a wind farm connected to a power grid, and more particularly to a system and a method for achieving optimal performance of the wind farm by improved forecasting of wind farm power production for short or medium term, which in turn is used for controlling power production of the wind farm.

A 'wind farm' is a group of wind turbines used for transforming wind energy to electrical power production. A large wind farm may include about 50 to 100 individual wind turbines that are spread over an extended area of hundreds of square kilometers. Individual turbines are typically interconnected via a medium voltage power collection system which in turn is connected to a high voltage transmission system or the 'power grid'.

Wind farms face an ongoing performance constraint due to the variability in power production that arises due to different wind conditions occurring sub-hourly, hourly, daily, or seasonally, and this variability directly impacts the stability of the power grid. Thus to ensure grid stability, the wind farms are often required to provide variable short term (for example, from few minutes up to an hour) to medium term (more than one to about 3 hours ahead) forecasts of total farm power. If the actual wind power production and forecast power is not contained within a pre-defined tolerance limit defined by the power grid for such forecasts, typically termed as over forecasting (actual power produced is less than the forecast) or under forecasting (actual power produced is more than forecast) limits, the wind farm has to pay a penalty in the form of curtailed power production or other forms of penalty.

Typically for short and medium term power forecast for the wind farm, a persistence forecasting model is used that relies on the most recent (~10-15 minutes earlier) total farm power. The persistence forecasting does not take into account any changes that may occur in the short term that may influence the wind power production.

In situations where wind gusts suddenly appear in the wind farm or other events occur where the wind speed continuously increases, generally referred as ramp-up events, the persistence model can have significant errors, leading to forecasted wind farm power that is consistently much lower than the actual wind farm power production potential thus impacting the performance of the wind farm.

Thus use of a persistence model for wind farm power production would consistently under forecast during ramp-up events and cause direct revenue loss due to inability of the wind farm to sell the total power produced, and might also lead to curtailment by the power grid, and any other penalties that the power grid may levy, which in short, means that the wind farm performance is not optimal when the persistence model for forecasting is employed for short and medium term forecasting. Other techniques that are being used to address the problem of persistence model forecasting rely mostly on wind turbine parametric data, and tend to select parameters of individual wind turbines and then generate forecasts based on these parameters. These techniques are often complex and time intensive, and not suitable at least for short term forecasting.

BRIEF DESCRIPTION

In one aspect, a method for controlling power production for a wind farm based at least in part on the power production forecast data, where the wind farm is connected to a power grid, is described. The method includes receiving time series data of actual power produced by the wind farm at a plurality of time instances in a data receiving time interval and deriving a plurality of power characteristic features from the time series data at each time instance from the plurality of time instances. The method then proceeds to generate power production forecast data for the wind farm for a forecast time interval using the plurality of power characteristic features and a set of tunable coefficients. The set of tunable coefficients are derived beforehand by using a tunable power forecasting model that is based on an asymmetric loss function applied on a history of time series data of actual power produced by the wind farm. The tunable power forecasting model characterizes optimal wind farm performance by providing an ability to favor selectively either over forecasting or under forecasting. The method then proceeds to transmitting of the power production forecast data to a power grid management system of the power grid; then receiving production set-points based on the power production forecast data from the power grid; and controlling wind farm power production based on production set-points. Further steps for monitoring the performance of forecasting and regenerating tunable coefficients or re-tuning the tunable model are also provided.

In another aspect, a system for controlling power production for a wind farm connected to a power grid is provided. The system includes a power grid management system for generating production set-points for wind farm power production; and a wind farm management system for generating power production forecast data and for controlling wind farm power production. The wind farm management system is communicatively coupled to the power grid management system, and the production set-points are based at least in part on power production forecast data.

The wind farm management system in this aspect includes a controller for controlling wind farm power production based on production set points received from the power grid management system, and for generating actual power production data of the wind farm. A feature extraction processor is included for generating a plurality of power characteristic features from the actual power production data for a data receiving time interval. A tunable power forecasting model is included for generating a set of tunable coefficients for optimal wind farm performance. The tunable power forecasting model is derived from applying an asymmetric loss function on a history of actual power production data of the wind farm. A forecast generation module is included for generating power production forecast data for a plurality of forecast time intervals, where the power production forecast data for each forecast time interval is based on the plurality of power characteristic features and the set of tunable coefficients. The wind farm management system also includes forecast monitoring and control module to monitor the performance of forecasting and generate necessary control action when performance is degrading.

In yet another aspect a wind farm management system for generating power production forecast data based on a tunable power forecasting model that is derived using an asymmetric loss function, where the wind farm management system controls the power production of the wind farm based at least in part on the power production forecast data, is described.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The system and method described herein relate to production of power from the wind farm that incorporate tunable power production forecasts for optimal wind farm performance. The 'optimal wind farm performance' referred herein takes into account the possibility of maximum power production of the entire wind farm over short or medium term time period, considering the differential penalties set by power grid for an over forecasting error and an under forecasting error.

The term 'over forecasting error' indicates that actual power production of the wind farm was less than the power production forecast, and the term 'under forecast error' indicates that the actual power production of the wind farm was more than the power production forecast. It will be understood to those skilled in the art that the power grid does have tolerance limits for these over forecast errors and under forecast errors and the penalties are levied when these tolerance limits are not met.

The 'short term' time period referred herein is a time period of about up to 30 minutes in one exemplary embodiment, to about up to one hour in another exemplary embodiment, and 'medium term' time period refers to a period of more than one hour to up to 3 hours. Typically the short term and the medium term are defined by the power grid or based on industry standards, and as such the embodiments of the invention will be applicable to other short terms or medium terms as determined by power grid or industry standards.

A 'user' referred herein refers to authorized personnel or systems or sub-systems associated with the wind farm that are authorized for access and interaction with the wind farm power management system as a whole or with specific modules of the wind farm power management system.

The system and method are described herein below in more detail in reference with the drawings.

Figure 1:
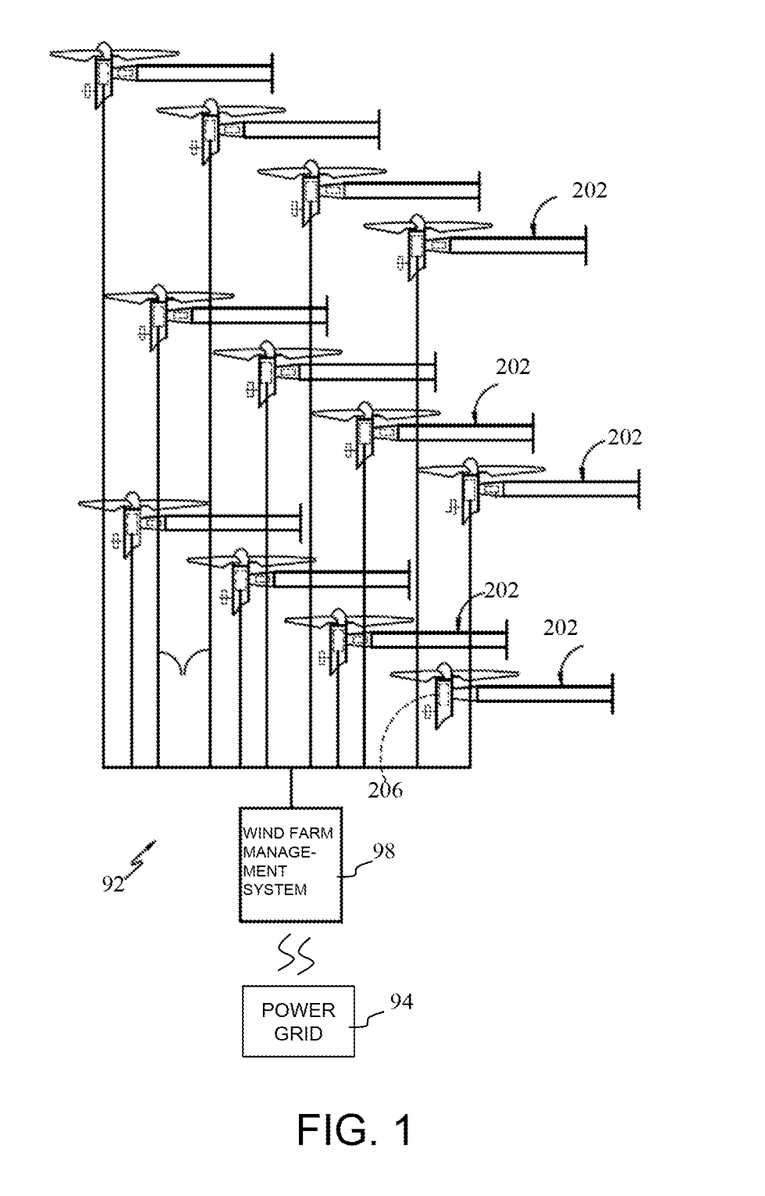
FIG. 1 is a general schematic diagram for a wind farm connected to a power grid referred in the embodiments of the invention.

FIG. 1 is a general schematic 200 of a wind farm 92 that produces and delivers power to a power grid 94 according to different aspects of the invention. As shown, the wind farm 92 may include a plurality of wind turbines 202, that are communicatively coupled to a wind farm management system 98 over a network 204. Each wind turbine has its own turbine controller 206 that is communicatively linked to the wind farm management system 98 through a wired or a wireless connection. The wind farm management system 98 comprises different modules that are used for achieving optimal wind farm performance according to different aspects of the invention. For better understanding of the invention, the method steps are first described herein below in reference to FIG. 2 that will facilitate in understanding the operation of the wind farm management system that is described in more detail in FIG. 7.

Figure 2:
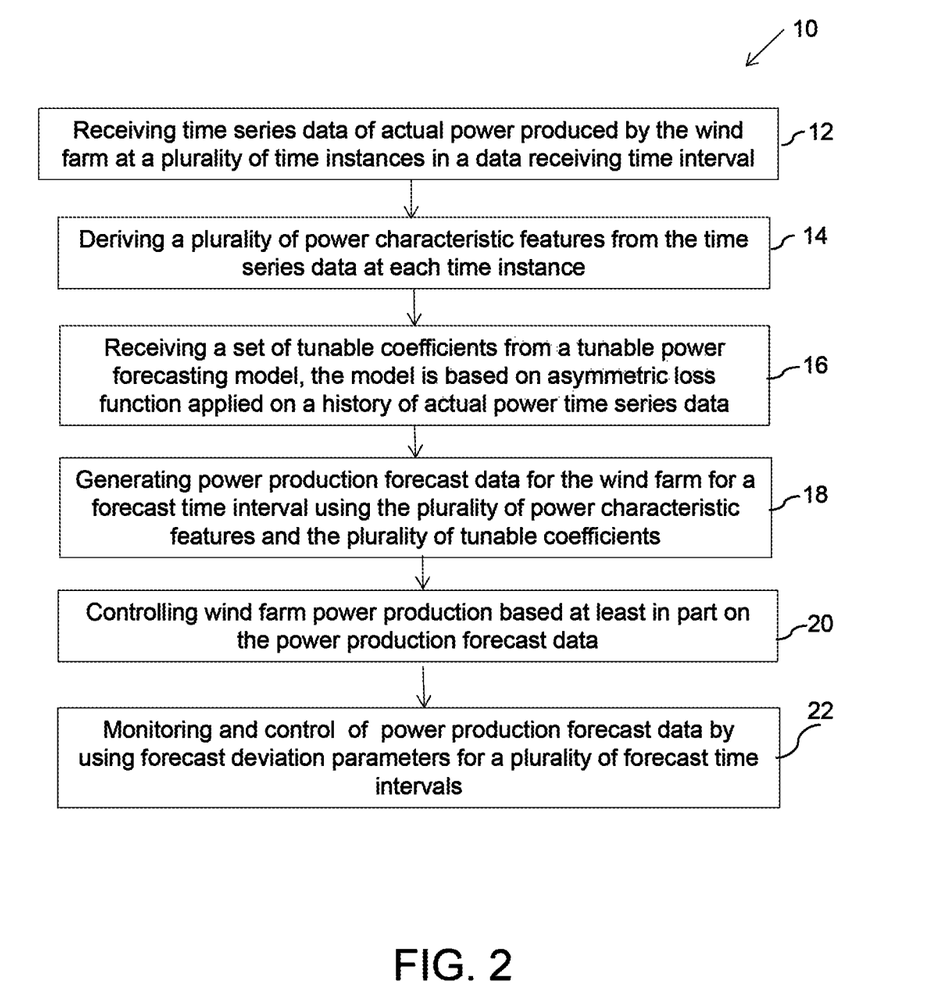
FIG. 2 is a flowchart representation of a method for controlling power production for the wind farm connected to the power grid according to an aspect of the invention.

Turning to FIG. 2, a flowchart representation 10 illustrates an exemplary method for controlling power production for the wind farm electrically coupled to the power grid. The method includes a step 12 for receiving time series data of actual power produced by the wind farm at a plurality of time instances in a data receiving time interval. The plurality of time instances are individual instances of time in the data receiving time interval. Non-limiting examples for the data receiving time interval include 10, 15, 20, and 30 minutes. In some embodiments the data receiving time interval may be less than 10 minutes. Non-limiting examples of timing of the individual time instances within a given time interval include every one minute or every five minutes. Time intervals and time instances may be specific or defined by the user.

The method then includes a step 14 for deriving power characteristic features from the time series data at each time instance. The power characteristics features include features, such as, but not limited to raw power values at every minute level (or at 5 minute interval or as user defined), the gradient values for the power values that capture the rate of change, average, minimum or maximum, all within the time interval. It may be noted here that under operation, the time interval is a preceding time interval with respect to a forecast time interval for which the forecast power production is being produced, and the power characteristic features are derived directly from the actual power production data in the data receiving time interval. The data receiving time interval will therefore, change for every forecast time interval, thus allowing the power characteristic features to be drawn from the actual power production data every time.

The method then includes a step 16 for receiving a set of tunable coefficients from a tunable power forecasting model. The tunable power forecasting model referred herein is derived using an asymmetric loss function that characterizes the optimal wind farm performance in which the tunable model is capable of selectively tuning towards at least one of over forecasting or under forecasting, and this aspect is described in more detail herein below.

The optimal wind farm performance as explained herein above, depends on delivering maximum power that can be produced by the wind farm to the power grid and minimizing any economic loss for the wind farm arising from any penalties imposed by the power grid. These penalties in turn are levied on the basis of power production forecast sent by the wind farm to the power grid. The power grid considers over forecast errors and under forecast errors for determining the penalties, and power grid has different penalties for both types of errors, as they impact the stability of the power grid, and the power grid has to manage the shortfall or over production. The tunable power forecasting model is derived based on these considerations, and advantageously uses an asymmetric loss function that is modified to provide a differential treatment for over forecasting and under forecasting errors. The tunable model is described in more detail below.

For simplicity, the actual power production value at time "t+h" is denoted as y (t), where:

$$y(t) = \text{mean}(\text{power in interval } [t+h, t+h+5]),$$

where "h" is user (wind farm or power grid) defined forecast frequency, and considers network issues such as latency that may be present during transmission of power production data to the power grid, "h" may be for example 5 minutes, or 8 minutes or 10 minutes.

Let the power characteristic features defined in the preceding paragraphs be indicated as $$x_{1t}, x_{2t}, \ldots, x_{kt}$$

These features are all computed using data available up to time t. The suffix t is omitted whenever evident in the foregoing description. For an exemplary embodiment, the actual power production for generating the model can be written as $$y_t = \alpha_0 + \alpha_1 x_1 + \alpha_2 x_2 + \ldots + \alpha_k x_k + \text{error}_t \quad \text{(Equation 1)}$$

Equation 1 refers to a linear model for power production, where $\alpha_0, \alpha_1, \ldots, \alpha_k$ are the set of tunable coefficients. Also the error term is usually assumed to have a standard Gaussian distribution. However, for the purposes of the embodiments described herein, the exact error distribution is not important.

The forecast power production for the time interval "t" is therefore given by the following Equation 2:

$$\hat{y}_t = \alpha_0 + \alpha_1 x_1 + \alpha_2 x_2 + \ldots + \alpha_k x_k \quad \text{(Equation 2)}$$

$\alpha_0, \alpha_1, \ldots, \alpha_k$ are the tunable coefficients and these tunable coefficients are derived from the tunable power forecasting model. Ideally, the tunable power forecasting model is trained for a period of time ranging from one month to 3 months, or a larger time horizon for 6 months. And the power characteristics features required for generating the power production forecast data, i.e. $x_{1t}, x_{2t}, \ldots, x_{kt}$ are derived from the preceding data receiving time interval.

Figure 3:
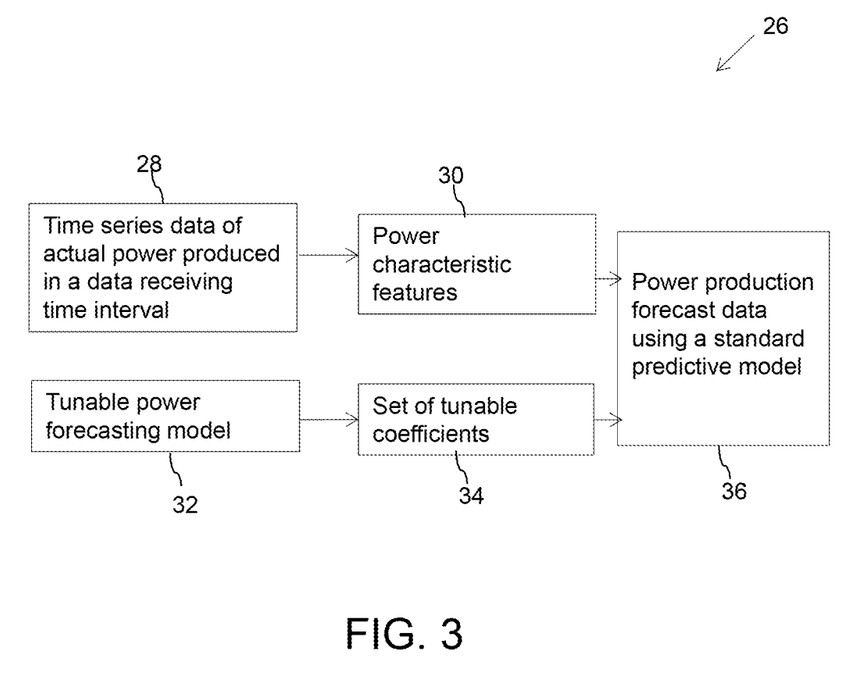
FIG. 3 is a diagrammatic representation of data flow for generating power production forecast data according to method steps of flowchart of FIG. 1.

Before moving to describe the tunable power forecasting model (also referred sometimes as a tunable model or a tunable forecasting model), the data flow in the method described so far is illustrated in the diagrammatic representation 26 of FIG. 3, which illustrates an exemplary implementation of the method for generating the power production forecast data (also referred sometimes as forecast data, production forecast, and forecast production data) for each forecast time interval. Reference numeral 28 in FIG. 3 refers to the time series data of actual power produced in the data receiving time interval, from which power characteristic features 30 are derived. The tunable power forecasting model 32 in turn provides the set of tunable coefficients 34. Using these two inputs of power characteristic features and set of tunable coefficients in a standard predictive model, for example model described by equation 2, the power production forecast data 36 is generated, that is shown at step 18 of FIG. 2. It would be appreciated by those skilled in the art that the same tunable coefficients may be used with different power characteristic features for each forecast time interval. This results in greater simplicity and greater speed in generating the power production forecasts which are tuned for optimal performance of the wind farm. In such an embodiment, the new tunable coefficients are re-generated only when there is a degradation in forecasting over a monitored time duration.

Before moving to further steps of the method, the tunable power forecasting model for estimating the tunable coefficients $\alpha_0, \alpha_1, \ldots, \alpha_k$, is explained in more detail. The tunable power forecasting model uses a loss function that which is minimized, and is represented below:

$$\min_{\alpha_0, \alpha_1, \ldots, \alpha_k} \sum_t L(y_t, \hat{y}_t) \quad \text{(Equation 3)}$$

Deviating from prior art methods of using loss functions such as linear absolute deviation or squared error loss function applied on wind speed or turbine parametric data, the asymmetric loss function used herein is applied to time series data of actual power produced and not to the turbine wind speed or any other individual turbine parametric data, and the asymmetric loss function is used with one or more tuning factors that define the condition for optimal wind farm performance by allowing selectively tuning the tunable power forecasting model towards over forecasting or under forecasting.

The physical or real world impact of using the asymmetric loss function as described herein is that, it allows for optimizing the wind farm performance by bringing in the flexibility of adjusting the power production forecasts towards over forecasting or under forecasting based on differential penalties levied by the power grid for the over-casting error and the under forecasting error. For example, in a use case, where the power grid levies higher penalties for under forecasting, and any additional power produced by the wind farm due to sudden availability of wind gusts or other wind turbine operations cannot be delivered to the power grid, then the optimal wind farm performance will be when the over forecasting error is considered more favorable than the under forecasting error. The asymmetric loss function allows for tuning the tunable model in favor of one of the forecasting errors for optimal wind farm performance. It may be noted here, that when the grid penalties change, that change can be easily accommodated by the flexibility provided in the method, that is implemented by use of the asymmetric loss function with one or more tuning factors.

The asymmetric loss function for an exemplary use case described above can be expressed as $$L(y, \hat{y}) = L(y - \hat{y}) = \tau (y - \hat{y})_+ + (1 - \tau)(y - \hat{y})_- \quad \text{(Equation 4)}$$

Where a positive value of $(y - \hat{y})_+$ indicates an equal amount of over forecast error whereas a positive value of $(y - \hat{y})_-$ indicates an equal amount of under forecast error.

Referring to Equation 4 of the asymmetric loss function, a value of $\tau = 1$ will only penalize under forecast only while $\tau = 0$ will penalize only over forecast, where $\tau$ is the tuning factor. The tuning factor is user defined and in exemplary non limiting implementation can be in a range of 0.5 to 1, for use cases where under forecast is a larger concern than over forecast.

Another exemplary asymmetric loss function that is used for some embodiments, is an asymmetric quadratic loss function that has flexibility of using more than one tuning factors, thus adding greater flexibility to the tunable power forecasting model. For this the tuning factors assign different weights to over forecasting and under forecasting errors. For asymmetric quadratic loss function more than one tuning factors can be used providing greater flexibility for the tuning of tunable power forecasting model.

For example, the following asymmetric quadratic function may be used:

$$L(y, \hat{y}) = k_1 (y - \hat{y})^2 \text{ if } y - \hat{y} < L \text{ with } L < 0 \text{ as an example}$$

$$L(y, \hat{y}) = k_2 (y - \hat{y})^2 \text{ if } y - \hat{y} > U \text{ with } U > 0 \text{ as an example}$$

$$L(y, \hat{y}) = (y - \hat{y})^2 \text{ if } U \geq y - \hat{y} \geq L$$

Where L, U are Lower and Upper limits that are user defined for under forecasting error and over forecasting error, and $k_1$ and $k_2$ are tuning factors.

In effect, by changing $k_1 \geq 0$ and $k_2 \geq 0$, an asymmetry for over forecasting error and under forecasting errors is created to account for differential penalties for these errors. Thus, in a situation where $k_1$ is much higher than $k_2$, the tunable model tends to penalize over forecast more harshly, while the reverse situation penalizes under forecast more harshly. Once the tunable coefficients are estimated using either the asymmetric linear or quadratic loss functions as described herein above, any future forecast can be generated using these tunable coefficients.

Figure 4:
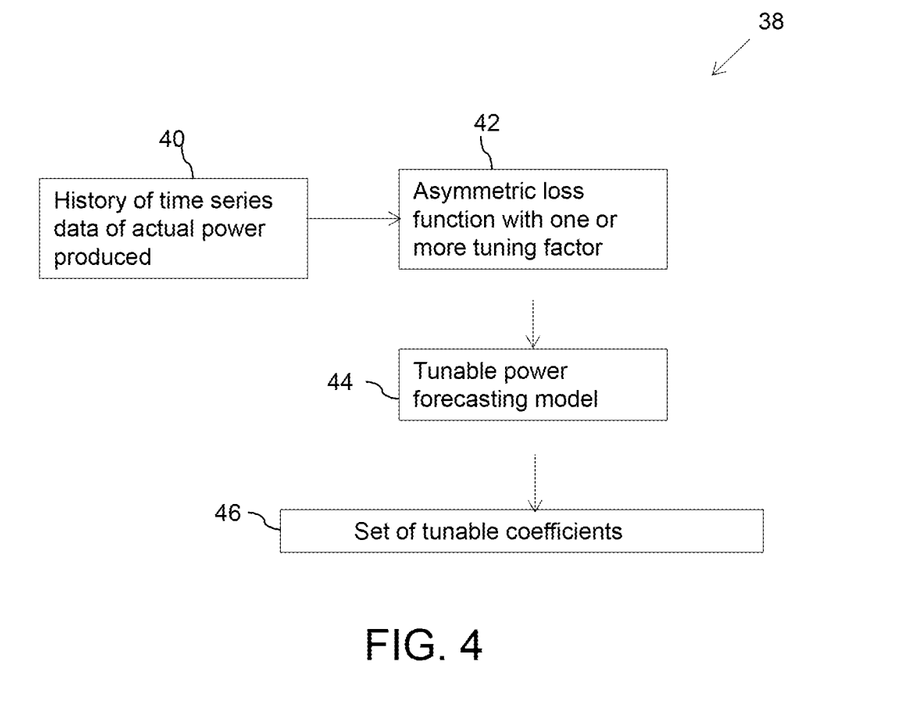
FIG. 4 is a diagrammatic representation of data flow for generating a set of tunable coefficients according to method steps of flowchart of FIG. 1.

Thus, the tunable power forecasting model as described herein above provides a unique way to tune the forecasts for optimal wind farm performance. To summarize, the data flow for generating the set of tunable coefficients is described in FIG. 4. The history of time series data of actual power produced, indicated by reference numeral 40 is used on which an asymmetric loss function with one or more tuning factors, as described herein above, and indicated by reference numeral 42 is applied to generate the tunable power forecasting model 44, and from which the set of tunable coefficients 46 are derived. It would be understood by those skilled in the art that the set of tunable coefficients are generated once from the trained tunable power forecasting model, and are used for every forecast time interval with new power characteristic features which are directly derived from a preceding time interval.

Referring again to the method in the flowchart 10 of FIG. 2, after the power production forecast data is obtained, it is used to control power production of the wind farm as shown by step 20. For example, in the specific embodiment of FIG. 2, the subsequent steps of the method include transmitting the power production forecast data to a power grid management system of the power grid and receiving production set-points based on the power production forecast data from the power grid. The wind farm power production is then controlled based on production set-points. In some other embodiments there may be other methods for controlling the wind farm power production by a wind farm management system that is based at least in part based on the power production forecast data.

The method may also include a step 22 for monitoring power production forecast data. This step monitors the power production forecasts for any degradation of forecasting performance. This is achieved by using forecast deviation parameters for a series of forecast time intervals. Each forecast deviation parameter is derived from a difference between power production forecast data and actual power produced for each forecast time interval. The forecast deviation parameter is then compared with at least one of an over forecasting error and an under forecasting error which are user defined. In one exemplary implementation the forecast deviation parameter is compared with both the over forecasting error and the under forecasting error.

Under exemplary implementation, the forecast deviation parameters are summarized at specified aggregating levels (minutes/hours/days etc.) either as raw values or some derived values, derived from standard as EWMA charts (Exponentially Weighted Moving Average) or CUSUM (Cumulative SUM) charts or other charts known in the art, and those derived (or raw) values are compared to pre specified (by user) bounds to come up with a binary decision regarding whether or not the set of tunable coefficients need to be reconfigured or the tunable power forecasting model requires to be retrained.

The Table 1 is an example for a simple xtype chart that considers daily average for forecast deviation parameters and compares those to a user defined threshold. As is seen from the table, on 21st day a breach is observed, the breach may be monitored for a few successive instances before a recalculation of tunable coefficients is initiated as a control action. In this example, the raw averages are directly used, more complex features such as those obtained post smoothing, centering and cumulative summing also may be used as is the case for standard EWMA or CUSUM charts.

TABLE 1

| DAY | FORECAST DEVIATION PARAMETER | THRESHOLD |
| --- | --- | --- |
| 16 | 10.57 | 17.05 |
| 17 | 10.11 | 17.05 |
| 18 | 9.65 | 17.05 |
| 19 | 9.84 | 17.05 |
| 20 | 11.3 | 17.05 |
| 21 | 22.48 | 17.05 |
| 22 | 22.37 | 17.05 |

Figure 5:
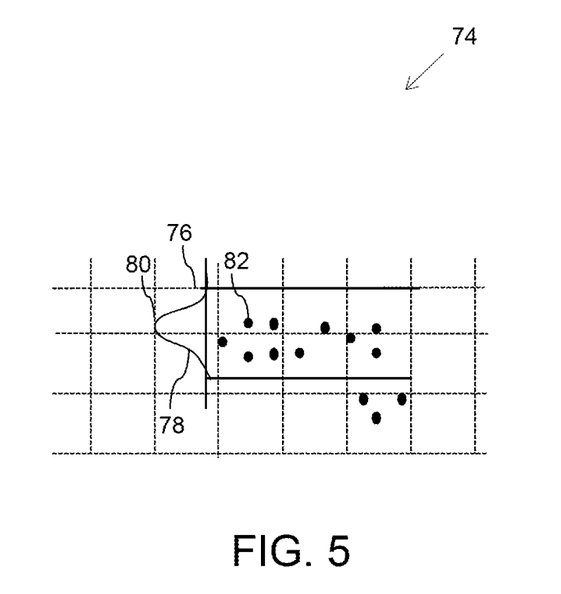
FIG. 5 is graphical representation of an example for statistical process control on the power production forecast data according to the method of flowchart of FIG. 1.

FIG. 5 is a graphical representation 48 of another example for statistical process control performed on the forecast deviation parameters 50, curve 52 showing the power production forecasts within the limits of user defined over forecasting error 54 and under forecasting error 56.

Figure 6:
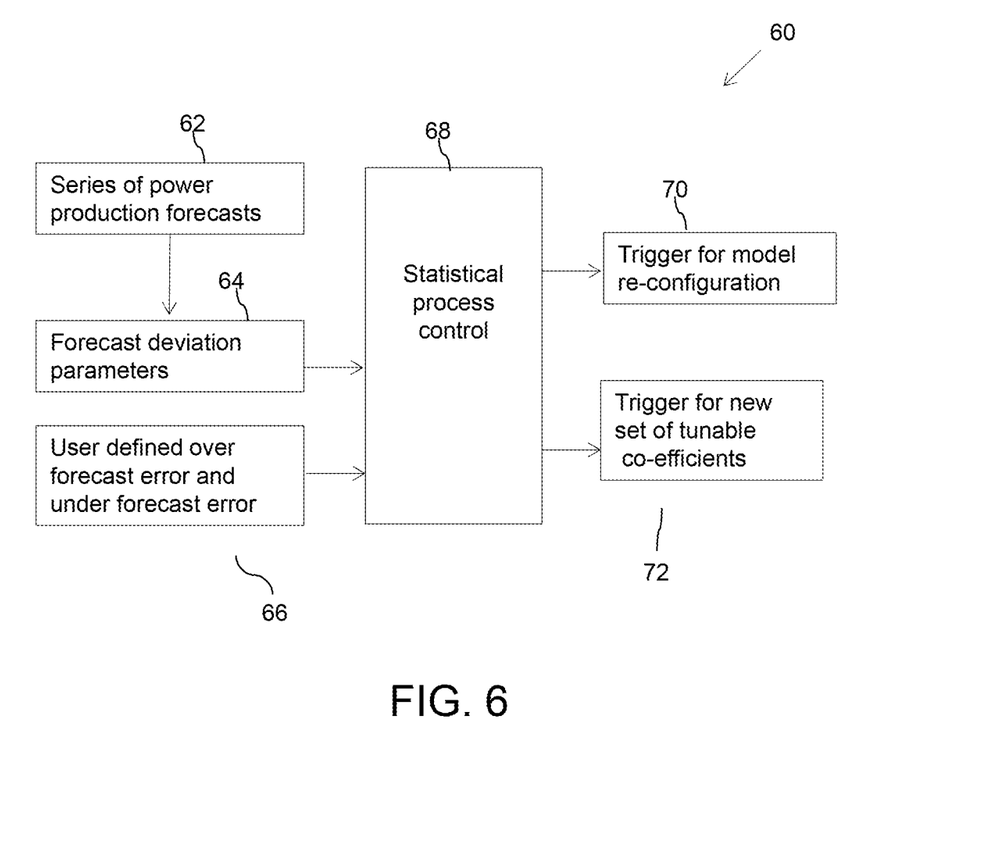
FIG. 6 is a diagrammatic representation of data flow for monitoring and control of forecasting performance in accordance with the method of flowchart of FIG. 1.

The data flow for monitoring and control of the forecasting performance is summarized in the diagrammatic representation 60 of FIG. 6. As shown, a series of power production forecasts 62 are used to generate forecast deviation parameters 64 that are used for statistical process control by known methods. The statistical process control includes user defined bounds for over forecast error and under forecast errors 66. The forecasting performance output 68 of the statistical process control results in a control action that in one example is a trigger 70 for reconfiguring the tunable power forecasting model (which in turn regenerates the set of tunable coefficients) or a trigger 72 for regenerating only tunable coefficients directly based on user input.

It may be noted here that for reconfiguring the tunable model, the tunable model is retrained for a new history of actual power production data. For reconfiguration of tunable coefficients, the value of tunable factor is changed to improve the performance of forecasting.

Figure 7:
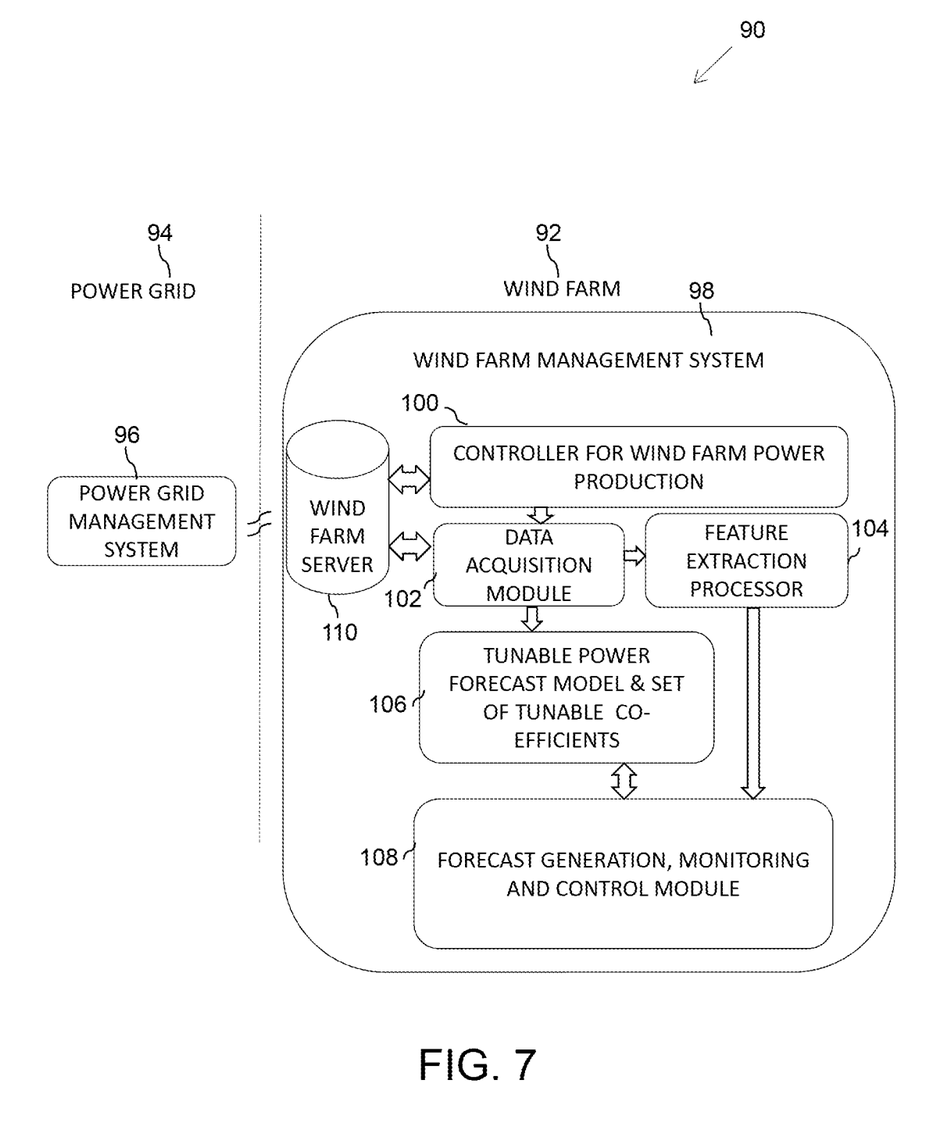
FIG. 7 is a diagrammatic representation of a system of controlling power production for the wind farm in accordance with another aspect of the invention.

Turning now to FIG. 7, another aspect of the invention is a system 90 for controlling power production for the wind farm 92 that is electrically coupled to the power grid 94 to deliver power produced by the wind farm. The system 90, in an exemplary embodiment includes a power grid management system 96 on the power grid side, for generating production set-points, for wind farm power production based on power production forecast data. The system 90 also includes a wind farm management system 98 for generating the power production forecast data, on the wind farm side. The wind farm management system 98 is communicatively coupled to the power grid management system 96. The wind farm management system 98 includes a controller 100 for wind farm power production for controlling wind farm power production, in one non-limiting embodiment the control is based on production set points received from the power grid management module 96.

For generating power production forecast data, the wind farm management system 98 includes several special modules described herein. A data acquisition module 102 is included to receive and store actual power production data of the wind farm received from the controller 100. The wind farm management system 98 includes a feature extraction processor 104 for extracting power characteristic features as described in reference to the method steps. The tunable power forecasting model 106 is included that is derived using an asymmetric loss function characterizing optimal wind farm performance, where the asymmetric loss function is applied on a history of time series data for actual power production, and uses one or more tuning factor, as described herein above in reference to the method steps. It may be worthwhile to mention here again that the tunable power forecasting model allows for selective tuning towards over forecasting or under forecasting, to ensure optimal wind farm performance. As explained herein above, the optimal wind farm performance is based on a differential treatment of over forecasting and under forecasting errors that relate to the differential penalties levied by the power grid for such errors.

A forecast generation, monitoring and control module 108 is provided for undertaking power production forecast generation, and monitoring and control of the performance of forecasting for optimal wind farm performance, i.e. the power production forecast data for different forecast time intervals are monitored over a given duration of time to ascertain any degradation of forecasting performance.

It would be understood by those skilled in the art that though FIG. 7 shows forecast generation, monitoring and control as a single module 108, three separate modules, i.e. forecast generation module, forecast monitoring module, and forecast performance control module may be implemented separately for the specific functions of generation, monitoring and control as described herein above in some implementations.

When implemented separately the forecast generation module uses the set of tunable coefficients from the tunable power forecasting model 106 and power characteristics features from the feature extraction processor 104.

Similarly, forecast monitoring module either separately or as a sub-module of integrated module 108 is used for monitoring the power production forecast data over a defined time period by comparing actual power production data and corresponding forecast power production data. The forecast monitoring module is used for obtaining forecasting deviation parameters based on a difference between actual production data and corresponding forecast production data. The monitoring module is further used for performing statistical process control on the forecasting deviation parameters and for generating a forecasting performance output characterizing forecasting performance. The statistical process control referred herein has been described in reference to the method of the invention.

For control aspect of forecasting performance, a stand alone forecasting control module can be implemented, or this feature can be integrated within module 108 in FIG. 7, for generating a control action based on the forecasting performance output from the forecasting monitoring module. The control action in the exemplary implementation is at least a trigger for reconfiguration or re-tuning of tunable power forecasting model, or regeneration of tunable coefficients. The trigger is at least one of a text message, an audio alarm or a visual alarm. The trigger may be used to activate a sensor for display of the alarm in a user device or in a user interface of the wind farm management system itself.

The system 90 also includes a wind farm server 110 to store the forecast production data, actual production data, production set-points, where the wind farm server is communicatively coupled to the power grid management server, and to the wind farm management system. It will be understood by those skilled in the art that the server would be used to store other data arising from or being used for generation of power production forecasts. For example the user defined inputs relating to tuning factor will be stored in the server, as well as data and user inputs for monitoring the performance of forecasting.

It another aspect, the wind farm management system 98 forms an embodiment of the invention with its components described in reference to FIG. 7. It would be appreciated by those skilled in the art that the power production forecast data generated by the wind farm management system may be utilized in other ways, where the wind farm power production is controlled at least in part based on the power production forecast data.

It would be appreciated by those skilled in the art that a communication interface, communicating means, and a communication network will be used that allow the flow of data, user inputs and commands between different components/modules of the wind farm management system as well as communication between the wind farm management system and the power grid management system. It would be understood by those skilled in the art that the communication is based on standard communication protocols for communicating between the wind farm and the power grid. The communication referred herein will be implemented over standard networks provided for the wind farm internal network and external network for communication with the power grid.

It would be further appreciated by those skilled in the art, that the different components/modules of the wind farm management system and power grid management system, as well as the method steps described herein, are implemented using embedded hardware and/or software by use of processors, micro-controllers, and/or input/output (I/O) components, microcomputers, programmable logic controllers (PLC), application specific integrated circuits, application-specific processors, digital signal processors (DSPs), Application Specific Integrated Circuits (ASICs), Field Programmable Gate Arrays (FPGAs), and/or any other programmable circuitry, and memory devices. The memory devices may include for example, a dynamic random access memory (DRAM) device, a static random access memory (SRAM) device, a digital versatile disc read only memory (DVD-ROM) device, a digital versatile rewritable (DVD-RW) device, a flash memory device, or other non-volatile storage devices. These components are configured as embedded circuitry to perform a variety of computer-implemented functions (e.g., performing the methods, steps, calculations and the like disclosed herein).

It would be also appreciated by those skilled in the art that user inputs, inputs and outputs associated with the wind farm management system and its' different components and power grid management system will employ a use of suitable input and output devices including human machine interfaces. The I/O devices may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. In additional embodiments, the I/O devices may include alphanumeric input components (e.g., a keyboard, a touch screen configured to receive alphanumeric input, a photooptical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In some embodiments, a non-transitory computer readable medium may be encoded with a program having instructions to instruct the wind farm management system 98 and power grid management system 96 to perform functions described for these systems and their components.

It would be appreciated by those skilled in the art, that the embodiments described herein allow for generating more accurate power production forecasts tuned for optimal wind farm performance, and additionally include monitoring of forecasting performance over a period time and performing a control action if the forecasting performance shows degradation.

It would also be appreciated by those skilled in the art that though the method and system described herein is in relation to wind power, the system and methods are equally applicable to other power generation sources which rely on forecasting.

It would be further understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling power production for a wind farm, wherein the wind farm is electrically coupled to a power grid, the method comprising:
   receiving, via a controller, time series data of actual power produced by the wind farm at a plurality of time instances in a data-receiving time interval;
   deriving, via the controller, a plurality of power characteristic features from the time series data at each time instance from the plurality of time instances, the plurality of power characteristics comprising at least one of a raw power value at each time instance from the plurality of time instances or a gradient value for the raw power value that captures a rate of change, average, minimum, or maximum of the raw power value within the data-receiving time interval;
   providing a set of tunable coefficients derived using a tunable power forecasting model, wherein the tunable power forecasting model is based on an asymmetric loss function applied on a history of time series data of actual power produced by the wind farm, wherein the tunable power forecasting model characterizes optimal wind farm performance, and wherein the optimal wind farm performance is based on a combination of different weights assigned for an over forecasting error and an under forecasting error;
   generating, via the controller, power production forecast data for the wind farm for a forecast time interval using the plurality of power characteristic features and the set of tunable coefficients;
   monitoring the power production forecast data for degradation by deriving forecast deviation parameters for a plurality of the forecast time intervals based on a difference between the power production forecast data and actual power produced for each of the forecast time intervals and then comparing the forecast deviation parameters to one or both of the over forecasting error or the under forecasting error;
   when the degradation is detected, re-generating the set of tunable coefficients and re-generating the power production forecast model based on the plurality of power characteristic features and the regenerated set of tunable coefficients;
   receiving production set-points from the power grid based on the power production forecast data; and
   operating, via the controller, the wind farm at the production set-points so as to control wind farm power production based at least in part on the power production forecast data.

2. The method of claim 1, wherein the monitoring for degradation further comprises applying statistical process control on the forecast deviation parameters.

3. The method of claim 1, wherein the over forecasting error and the under forecasting error are user defined.

4. The method of claim 1, wherein the forecast time interval is in a range of 5 minutes to 30 minutes.

5. A system for controlling power production for a wind farm based at least in part on power production forecast data, wherein the wind farm is electrically coupled to a power grid, the system comprising:
   a power grid management system that generates production set-points for wind farm power production based on the power production forecast data;
   a wind farm management system that generates the power production forecast data and for controlling the wind farm power production, wherein the wind farm management system is communicatively coupled to the power grid management system, the wind farm management system comprising:
   a controller that operates the wind farm at the production set-points received from the power grid management module so as to control wind farm power production, and for generating actual power production data of the wind farm,
   a feature extraction processor that generates a plurality of power characteristic features from the actual power production data for a data-receiving time interval, the plurality of power characteristics comprising at least one of a raw power value at each time instance from the plurality of time instances or a gradient value for the raw power value that captures a rate of change, average, minimum, or maximum of the raw power value within the data-receiving time interval, a tunable power forecasting model that generates a set of tunable coefficients for optimal wind farm performance, wherein the tunable power forecasting model is derived from applying an asymmetric loss function on a history of actual power production data of the wind farm, and wherein the optimal wind farm performance is based on a combination of different weights assigned for an over forecasting error and an under forecasting error, a forecast generation module that generates the power production forecast data for a plurality of forecast time intervals, wherein the power production forecast data for each forecast time interval is based on the plurality of power characteristic features and the set of tunable coefficients, a forecast monitoring module that monitors the power production forecast data over a defined time period for degradation, wherein the degradation is determined by deriving forecast deviation parameters for a plurality of the forecast time intervals based on a difference between the power production forecast data and actual power produced for each of the forecast time intervals and then comparing the forecast deviation parameters to one or both of the over forecasting error or the under forecasting error, and a forecast control module that regenerates the set of tunable coefficients when the degradation is detected and wherein the forecast generation module re-generates the power production forecast data based on the plurality of power characteristic features and the regenerated set of tunable coefficients.

6. The system of claim 5, wherein the forecast monitoring module performs statistical process control on the forecast deviation parameters.

7. The system of claim 5, wherein the forecast control module is further configured to send a trigger to a user indicating that regeneration of the set of tunable coefficients or returning of the tunable power forecasting model based on the monitored degradation is needed.

8. The system of claim 7, wherein the trigger comprises at least one of a text message, an audio alarm or a visual alarm.

9. The system of claim 5, further comprising a data acquisition module that receives and stores the actual power production data received from the controller, and wherein the data acquisition module is communicatively coupled to the feature extraction processor and the tunable power forecasting model.

10. The system of claim 5, wherein the wind farm management system further comprises a wind farm server to store the power production forecast data, actual power production data, and production set-points.

11. The system of claim 5, wherein the tunable power forecasting model is derived by using one or more tuning factors to characterize optimal wind farm performance.

12. A wind farm management system for controlling power production for a wind farm connected to a power grid, the wind farm management system comprising:

a controller that generates actual power production data of the wind farm;

a feature extraction processor that generates a plurality of power characteristic features from the actual power production data for a data-receiving time interval, the plurality of power characteristics comprising at least one of a raw power value at each time instance from the plurality of time instances or a gradient value for the raw power value that captures a rate of change, average, minimum, or maximum of the raw power value within the data-receiving time interval;

a tunable power forecasting model that generates a set of tunable coefficients for optimal wind farm performance, wherein the tunable power forecasting model is derived from applying an asymmetric loss function on a history of actual power production data of the wind farm, and wherein the optimal wind farm performance is based on a combination of different weights assigned for an over forecasting error and an under forecasting error;

a forecast generation module that generates the power production forecast data for a plurality of forecast time intervals, wherein the power production forecast data for each forecast time interval is based on the plurality of power characteristic features and the set of tunable coefficients, a forecast monitoring module that monitors the power production forecast data over a defined time period for degradation, wherein the degradation is determined by deriving forecast deviation parameters for a plurality of the forecast time intervals based on a difference between the power production forecast data and actual power produced for each of the forecast time intervals and then comparing the forecast deviation parameters to one or both of the over forecasting error or the under forecasting error, and a forecast control module that regenerates the set of tunable coefficients when the degradation is detected and wherein the forecast generation module re-generates the power production forecast data based on the plurality of power characteristic features and the regenerated set of tunable coefficients, wherein the controller receives production set-points from the power grid based on the power production forecast data operates the wind farm at the power production set points so as to control wind farm power production based at least in part on the power production forecast data.

13. The wind farm management system of claim 12, further comprising a data acquisition module that receives and stores the actual power production data received from the controller, and wherein the data acquisition module is communicatively coupled to the feature extraction processor and the tunable power forecasting model.

14. The wind farm management system of claim 12, further comprising a wind farm server to store at least the power production forecast data, and actual power production data.

* * * * *